E. CRAIG.
HANDLE MACHINE.
APPLICATION FILED APR. 17, 1916.

1,264,901.

Patented May 7, 1918.
8 SHEETS—SHEET 1.

Fig. 1.

Witnesses:

Inventor:
Edward Craig
By Arthur F. Durand
Atty.

E. CRAIG.
HANDLE MACHINE.
APPLICATION FILED APR. 17, 1916.

1,264,901.

Patented May 7, 1918.
8 SHEETS—SHEET 4.

E. CRAIG.
HANDLE MACHINE.
APPLICATION FILED APR. 17, 1916.

1,264,901.

Patented May 7, 1918.
8 SHEETS—SHEET 6.

E. CRAIG.
HANDLE MACHINE.
APPLICATION FILED APR. 17, 1916.

1,264,901.

Patented May 7, 1918.
8 SHEETS—SHEET 7.

E. CRAIG.
HANDLE MACHINE.
APPLICATION FILED APR. 17, 1916.

1,264,901.

Patented May 7, 1918.
8 SHEETS—SHEET 8.

UNITED STATES PATENT OFFICE.

EDWARD CRAIG, OF ST. JOSEPH, MICHIGAN.

HANDLE-MACHINE.

1,264,901. Specification of Letters Patent. Patented May 7, 1918.

Application filed April 17, 1916. Serial No. 91,531.

*To all whom it may concern:*

Be it known that I, EDWARD CRAIG, a citizen of the United States of America, and resident of St. Joseph, Berrien county, Michigan, have invented a certain new and useful Improvement in Handle-Machines, of which the following is a specification.

My invention contemplates a machine for making wire handles for baskets or other receptacles, such as bushel or half-bushel baskets, and for applying said handles to the rims of the said baskets or other receptacles, practically by one general operation for each handle, involving the bending of a length of wire into staple-form, the bending of the two end portions of the staple in the same direction at right angles to the plane of the staple, and the final insertion of the said end portions in the rim of the basket or other receptacle, whereby each staple-shaped handle is made and secured to the basket or other receptacle before the next handle is made.

The object of my invention is, therefore, to provide a machine which will not only produce satisfactory handles for the baskets, or for other receptacles, but which will also reduce the cost of manufacture.

To this and other useful ends, my invention consists in matters hereinafter set forth and claimed.

In the accompanying drawings:—

Figure 1:
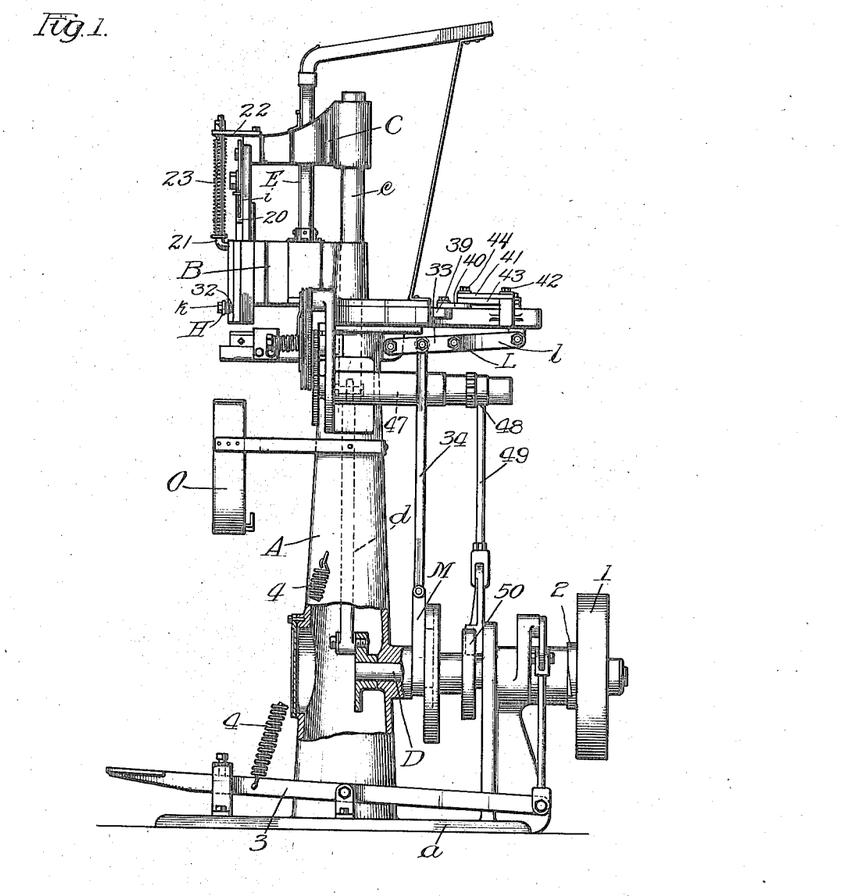
Figure 1 is a side elevation of a handle-making and applying machine embodying the principles of my invention.

As thus illustrated, my invention comprises an upright standard A mounted on a base or pedestal $a$ and provided at its upper end with a fixed head B, the upper or movable head C being secured to the upper end of the rod $c$ which slides up and down in the said stationary head. The crank shaft D is mounted horizontally in suitable bearings just above the base or pedestal of the machine, and is connected by a pitman $d$ with the lower end of the rod $c$, whereby the rotation of this shaft causes the head C to be reciprocated up and down. A pulley 1 is mounted on the said shaft to drive the same, and the operation of the machine is controlled by a clutch 2, of any suitable character, through the medium of a foot-lever 3 which is pivoted on the base and held by a spring 4 in normally raised position.

Figures 3, 4:
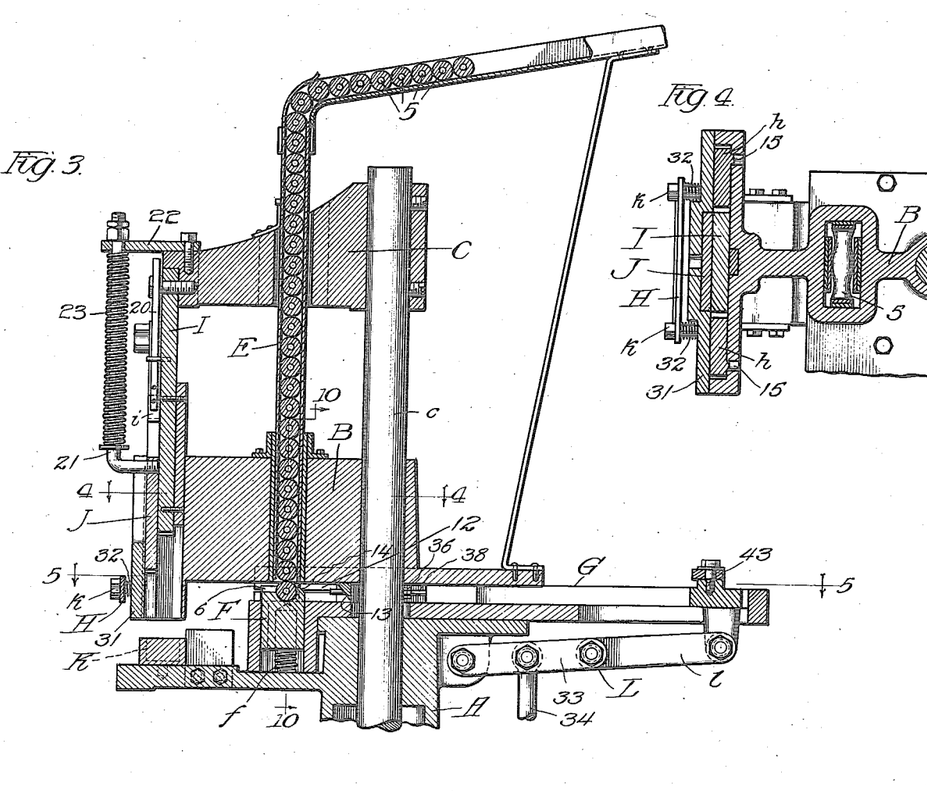
Fig. 3 is a vertical section on line 3—3 in Fig. 2, on a smaller scale, showing a hopper for feeding wooden grips to the mechanism which reduces the length of wire to staple-form, whereby each handle will have a cylinder of wood thereon which serves as a grip.
Fig. 4 is a horizontal section on line 4—4 in Fig. 3.
Figures 5, 8, 9:
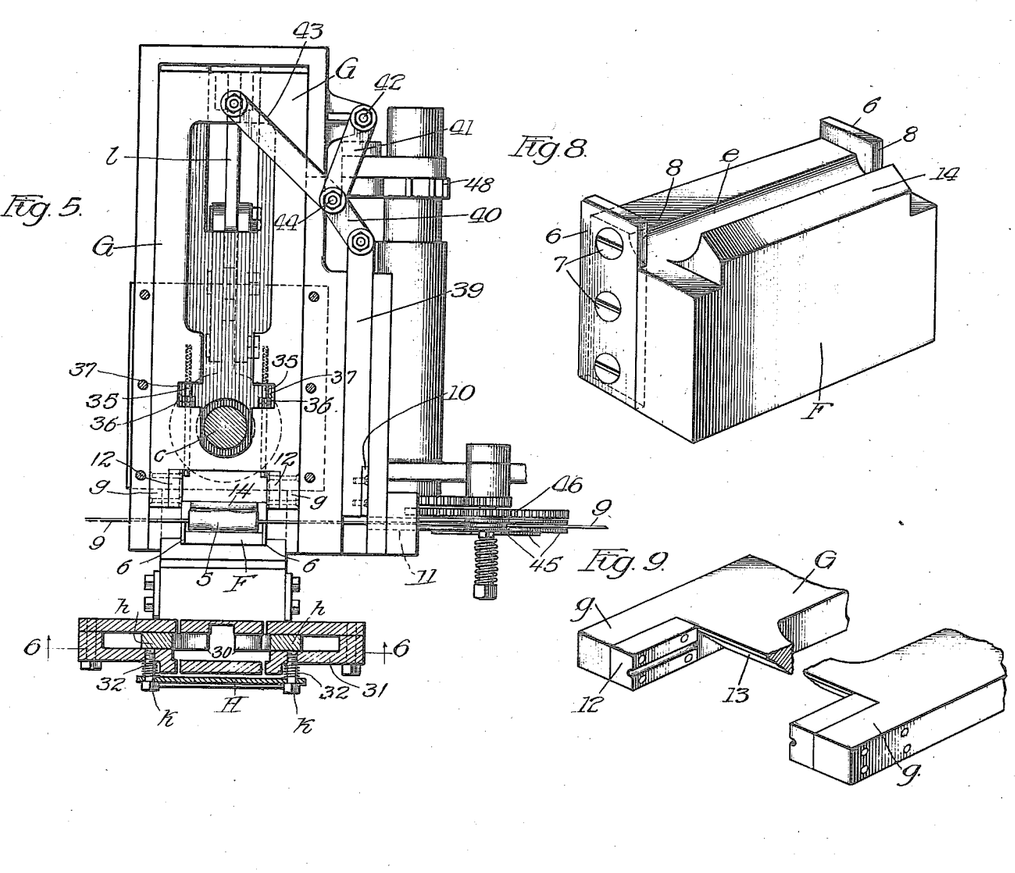
Fig. 5 is a horizontal section on line 5—5 in Fig. 3.
Fig. 8 is a perspective of the vertical movable block which supports the length of wire during the bending thereof into staple-form, and which moves downward after the bending operation to permit the staple to move forward to the means for bending the ends of the staple downward, this block being provided with a wide groove to receive the wooden grip, and this form of block being used only when the hopper arrangement for feeding the grips shown in Fig. 3 is employed.
Fig. 9 is a fragmentary perspective view of a portion of the former by which the straight length of wire is bent into staple-form.
Figure 11:
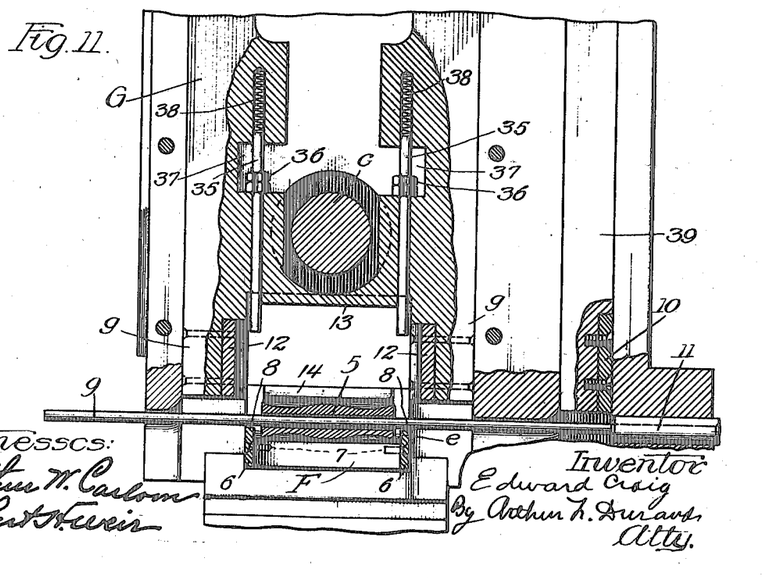
Fig. 11 is an enlarged plan view of the mechanism for bending the wire into staple-form, showing certain portions thereof in horizontal section.

The mechanism for bending the wire to staple-form is as follows:

The wooden grips 5 (see Fig. 3) are fed downward through a hopper E and are thereby delivered one by one to the groove $e$ in the top of the forming-block F, which latter is preferably rectangular and mounted in the head B to slide up and down, being yieldingly supported by springs $f$ suitably arranged below. This block F is provided with vertically disposed end-plates 6, preferably of hard steel, secured in place by screws 7, these plates being parallel and disposed in vertical planes. The forward edges of these plates project a short distance across the ends of the groove $e$, so that the wire 9, when the latter is fed into place across the top of said block, is directly in front of these edges 8, in the manner shown in Fig. 11. The wire is fed through the wooden grip 5 which rests in the groove $e$, and in this position the wire is then ready to be cut off by the cutter 10 which reciprocates horizontally at a distance from one end of the block F, being arranged to coöperate with the steel feed-tube 11 in severing the wire. The staple-former G consists of a substantially flat plate disposed in a horizontal plane and arranged to reciprocate in a direction at right angles to the length of wire, being provided with a forked end-portion having the prongs $g$ thereof provided on their inner sides with grooved steel blocks 12 adapted to slide forward upon the outer surfaces of the plates 6, thereby to bend the extremities of the wire 9 around and upon the said outer surfaces of the plates 6, thus reducing the wire to staple-form, the edges 8 serving as anvils during this bending operation. The former G is provided with a bevel 13, and the forming-block F is provided with a bevel 14, which latter extends along the front side of the groove $e$, whereby the continued forward movement of the staple-former brings the bevel 13 into engagement with the bevel 14 and causes the block F to move downward and out of the way.

Figures 2, 7:
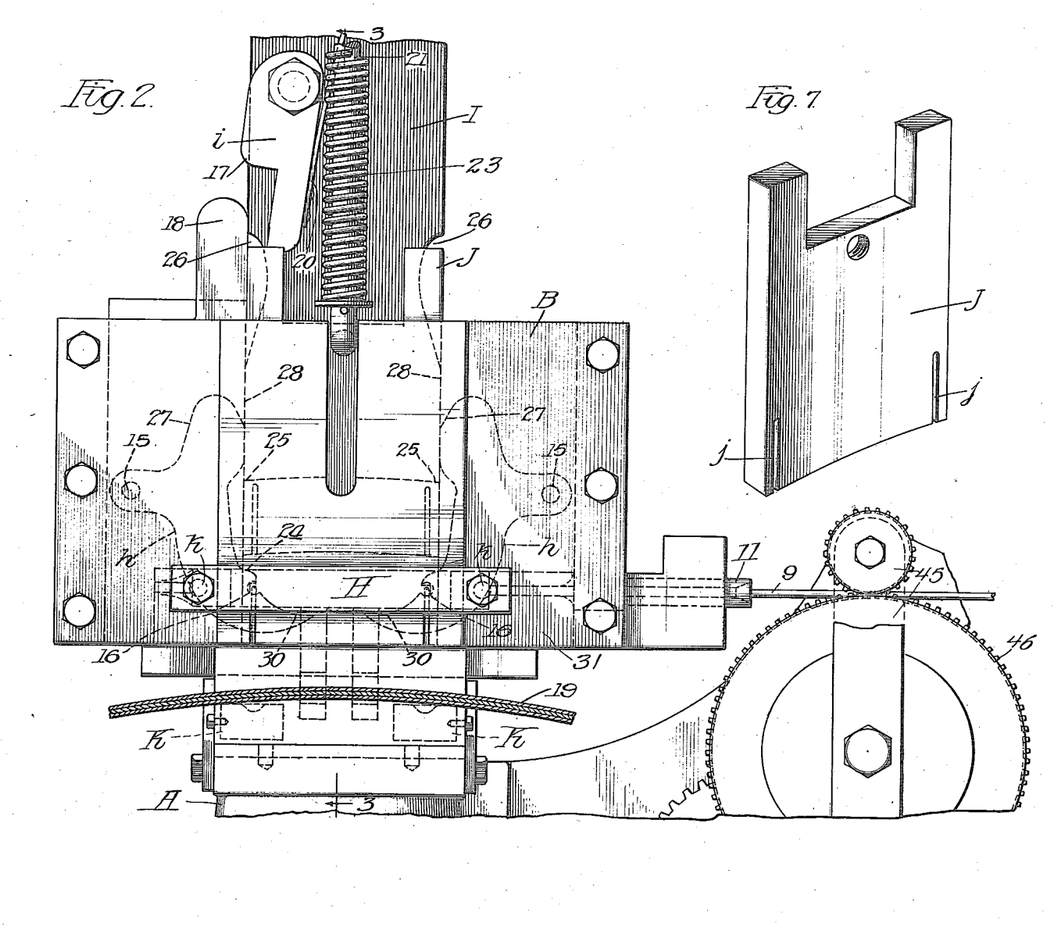
Fig. 2 is an enlarged front elevation of the driving mechanism by which the handle is inserted through the rim of the basket or other receptacle.
Fig. 7 is a perspective of the former by which the ends of the large staple are bent downward preliminary to the insertion thereon in the rim of the basket, and which serves as a guide during the driving operation.
Figures 6, 14, 15, 16:
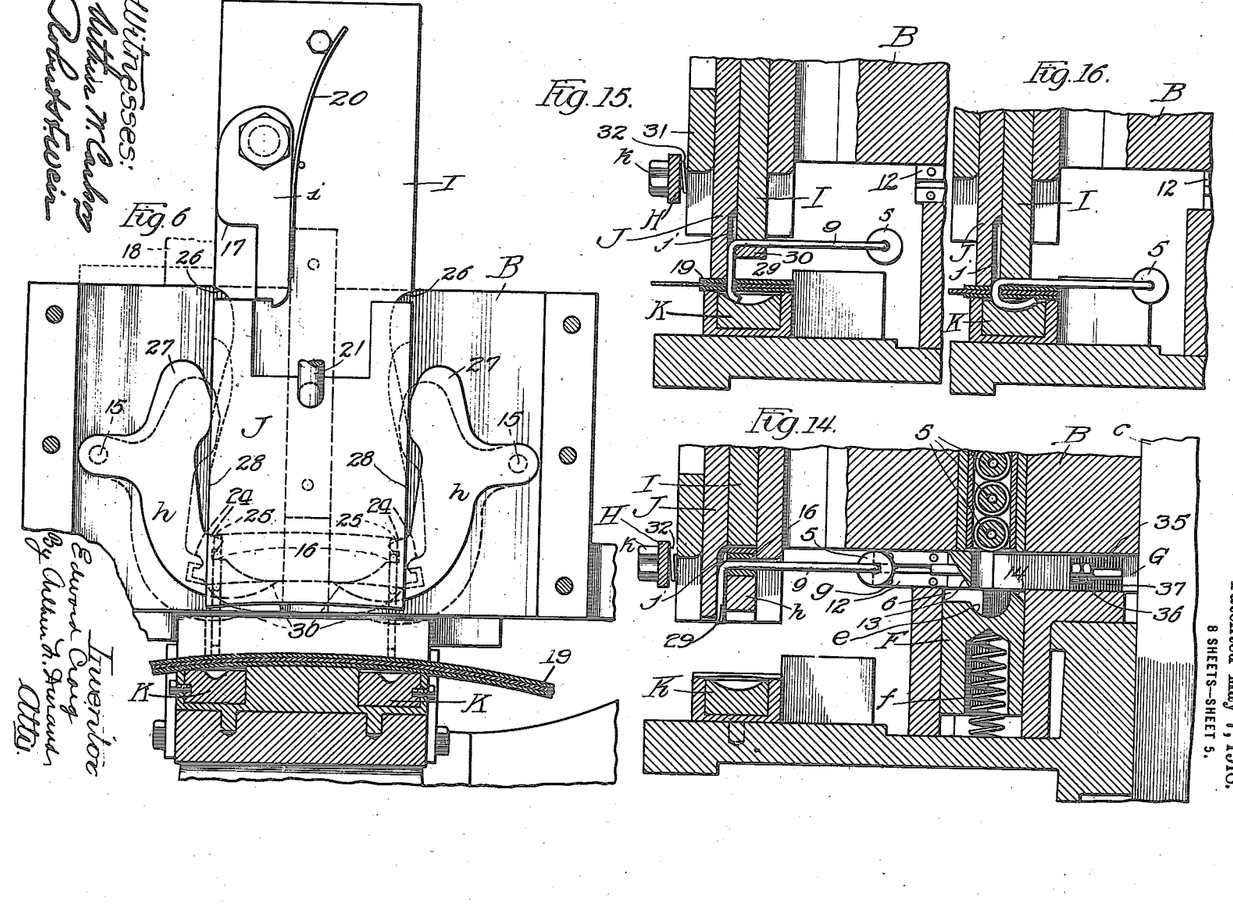
Fig. 6 is a vertical section on line 6—6 in Fig. 5, on a larger scale.
Fig. 14 is a vertical section of said staple-forming mechanism, and of the means for bending the ends of the staple downward, showing the positions of the parts immediately after the bending of the ends of the staple.
Fig. 15 is a similar view showing the positions of certain of the parts during the initial insertion of the staple ends through the rim of the basket.
Fig. 16 is a similar view showing the positions of the parts upon the completion of the driving operation.
Figure 10:
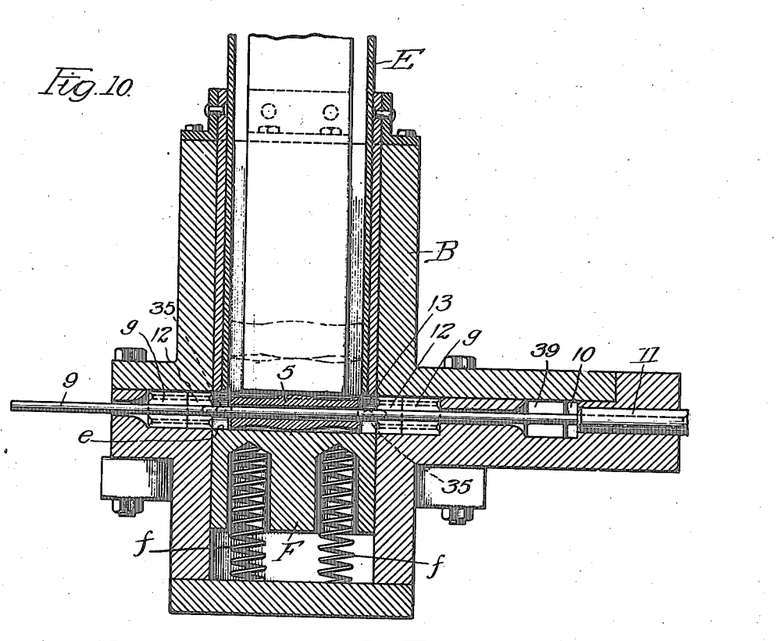
Fig. 10 is a vertical section on line 10—10 in Fig. 3, on a larger scale.

The means for bending the ends of the staples downward is as follows:

The further forward movement of the staple-former G serves to carry the staple forward to a point where the ends thereof engage the flat plate H on the front of the head B, which plate thereby serves as a stop to limit the forward feeding motion of the staple. The front of the head B is provided with a pair of pivoted members $h$ which are pivoted at 15 to swing toward and away from each other about horizontal axes. These members are provided with supporting openings 16 for the ends of the staple, whereby the latter will be supported during the next operation, which consists in bending the said ends downward. The driver I is a substantially flat plate which reciprocates up and down in the front portion of the stationary head B, and the former J is another substantially flat plate which is disposed against the outer side of the said driver, which is provided with grooves $j$ to engage and force the ends of the staple downward. The driver I is provided with a pivoted latch $i$ to engage the upper end of the former J, while the driver and former are moving downward to bend the ends of the staple. A cam 17 on said latch engages a stationary cam 18, at the proper time, thereby to unlatch the former J, permitting the latter to remain stationary upon the upper surface of the basket-rim 19 (see Figs. 2 and 6) during the time that the driver I is moving downward alone to insert the bent ends of the staple into said basket-rim. A spring 20 returns the latch $i$ to locking position when the former J and the driver I again move upward. A rod 21 is secured to the upper end of the former J and extends upward through a guide 22 on the front of the head C, and a compression spring 23 is mounted on this rod, whereby the former J is yieldingly held down upon the basket after it is unlocked from the driver, and whereby the driver and former are then returned to their normal relative positions when they move upward. The driver I is, of course, secured at its upper end to the vertically reciprocating head C, so that the said driver is capable of exerting a positive downward thrust upon the staple ends. Of course, before the said staple ends can be inserted in the basket-rim, the lower ends of the pivoted supporting members $h$ must be swung out of the way of the driver I, and for this purpose said members have cams 24 which are engaged by the lower corners 25 of the driver, when the latter moves downward, thereby pushing these members h out of the way. This is made possible by providing the driver with notches 26 at opposite sides thereof, into which notches the cams 27 of said members h move toward each other to permit the lower ends of said members to move away from each other. When the driver I moves upward, the straight side edges 28 of the driver then push the cams 27 outward and away from each other, thus returning the openings 16 to the positions which they must assume in order to receive the staple ends. In Fig. 14, the driver I and the former J have moved downward, and the end portions 29 of the staple have been bent downward at right angles to the plane of the staple. In Fig. 15, the said driver and former have moved downward to an extent sufficient to accomplish the initial insertion of the staple in the basket, it being observed that the end portions 30 of the members h are still supporting the staple. In Fig. 16, the operation has advanced to the point where the members h have been completely thrust out of the way by the driver I, so that the end portions of the staple have been fully inserted and clenched on the rim of the basket. During this operation, it will be seen that the grooves j in the former J serve as guides for the end portions 29 of the staple, thereby supporting the latter and preventing them from collapsing under the strain during the driving operation. The anvils or clench-blocks K are of any suitable form or character, and are removably supported directly below the path of the driver I, so that they form a support for the rim of the basket during the operation of securing the handle thereto. The plate H is held in position by bolts k, which latter are adjustably inserted in the front plate 31 of the stationary head B, springs 32 being interposed between these two plates to keep the plate H against the heads of the bolts, and to permit adjustment of the plate H toward and away from the plate 31, when such is necessary or desirable. In this way, the forward movement of the staple can be variably limited to suit the requirements and to insure accuracy in the driving operation.

Figure 12:
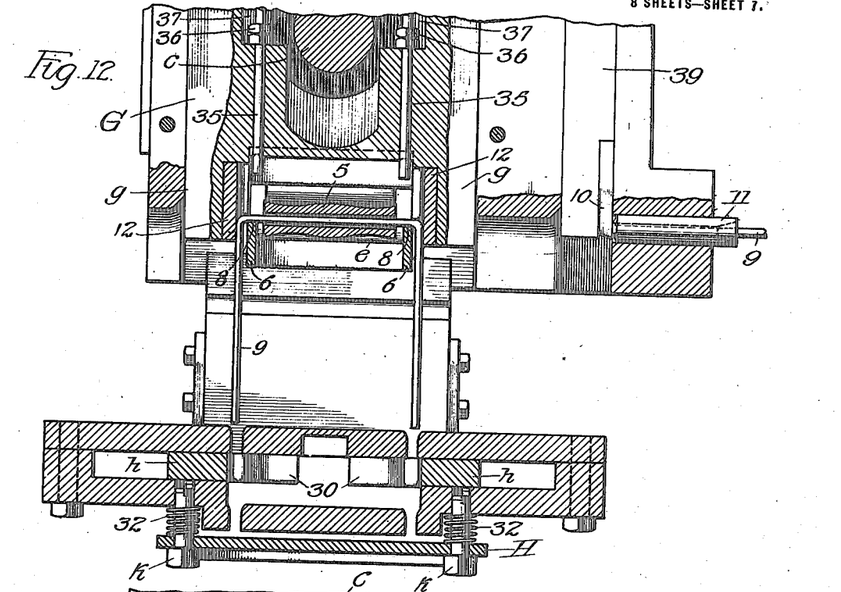
Fig. 12 is a view similar to Fig. 11, but showing the wire bent into staple-form.
Figure 13:
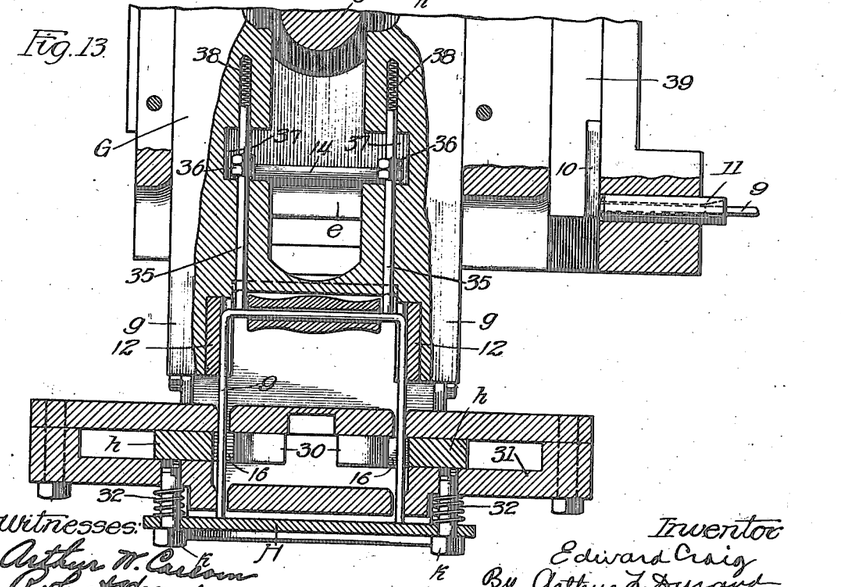
Fig. 13 is a similar view showing the staple with a wooden grip thereon moved forward and into a position to have the ends of the staple bent downward preparatory to the insertion thereof in the rim of the basket.

Any suitable mechanism can be employed for reciprocating the horizontal former G, as, for example, the toggle-device L consisting of a link l pivoted on the bottom of said former, another link 33 pivoted on the body of the machine, and a vertically reciprocating rod 34 having its upper end pivotally connected with the link 33 between the ends of the latter. A cam mechanism M on the crank-shaft D is provided for reciprocating the rod 34 up and down, said mechanism being constructed and arranged and properly timed to move the former G back and forth in the manner required by the construction and mode of operation shown and described. Preferably, the said former G is provided at its forward end with a pair of rods 35 which are parallel and disposed in the horizontal plane, and which are free to reciprocate endwise. The forward ends of these rods 35 are immediately inside of the steel blocks 12, whereby these ends of the rods 35 engage the staple when the former moves forward (see Figs 12 and 13). Nuts 36 on the rods 35 serve to limit the endwise reciprocation thereof, relative to the former G, these nuts being arranged to move back and forth in the recesses 37 in said staple-former. Springs 38 are suitably arranged to bear against the rear ends of these rods 35, and are compressed when the staple-former moves forward to an extent to bring the forward ends of the rods 35 against the said staple. Thus, the rods continue to hold the staple in its forward position for a time during the return movement of the staple-former G to its normal or retracted position.

The cutter 10 may be operated in any suitable manner, but is preferably mounted on a bar 39 which has its rear end pivotally connected with a link 40 which swings in a horizontal plane. This link is, in turn, pivotally connected with a link 41 which is pivoted at 42 on a stationary portion of the body of the machine. A longer link 43 is pivoted on the rear end of the staple-former G and has its other end pivoted at 44 to the joint between the links 40 and 41, thus providing a toggle arrangement for reciprocating the bar 39, causing the cutter 10 to operate at the proper time to sever the wire.

Any suitable mechanism can be used for feeding the wire to the tube 11, in the required manner, thereby to automatically supply the wire to the forming mechanism. For example, feed rolls 45 can be employed for this purpose, said rolls being connected by a gearing 46, of any suitable character, with the horizontal shaft 47 which is actuated at its outer end by a ratchet-feed-device operated by the pitman 49 which extends downward to a cam-mechanism 50 on the crank-shaft D.

Figure 18:
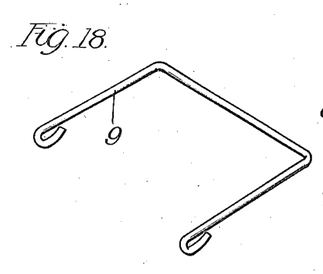
Fig. 18 is a perspective of the completed handle without the wooden grip.
Figure 19:
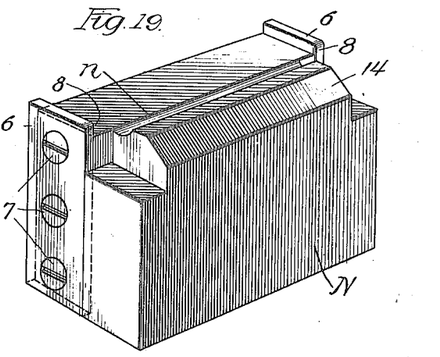
Fig. 19 is a perspective of the forming block or handle support which is used when the wooden grips are not employed.

If it is not desired to use the wooden grips 5, then a forming-block N is used in place of the block F (see Fig. 19), it being observed that this block has a comparatively narrow groove n to receive the wire directly therein. In Fig. 21, this block N, and the other parts, are shown in position to receive the wire in the groove n, preparatory to bending the length of wire into staple-form. In such case, the handle will then be of the form shown in Figs. 18 and 20.

Figure 17:
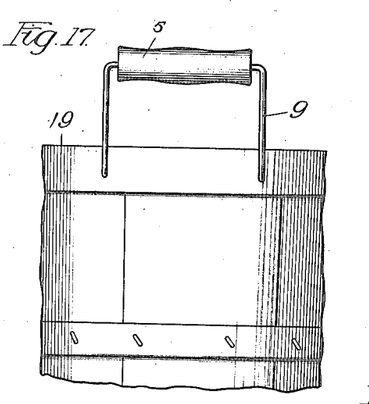
Fig. 17 is a side elevation of the handle secured to the basket, showing the handle provided with a wooden grip.
Figure 20:
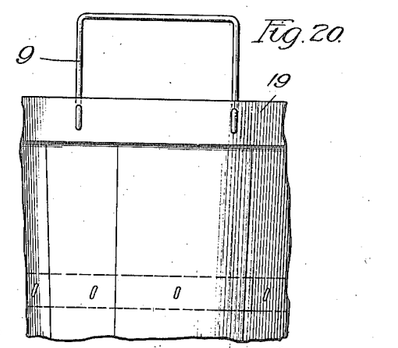
Fig. 20 is a side elevation of the completed handle, showing the same without the wooden grip, and illustrating the handle as applied to the basket.
Figure 21:
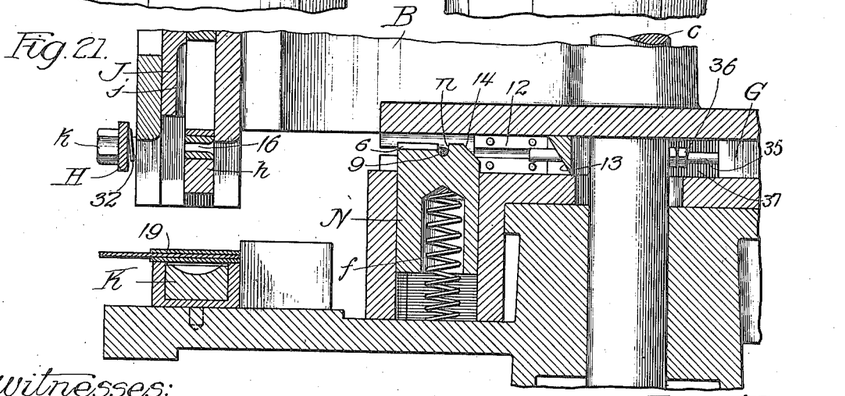
Fig. 21 is a view similar to Fig. 14, but showing the forming block shown in Fig. 19, and showing the parts in condition to receive the wire which is to be bent into staple-form and thereafter applied to the basket.

It will be understood, of course, that these handles can be applied to the outer side of the rim of the basket, as shown in Figs. 17 and 20, and in such case the basket will be steadied and held in position by the gage O which is suitably constructed and arranged at the front of the machine, being of any suitable form which will engage the lower portion of the basket while the upper side is receiving the handle. Obviously, however, the machine can be employed for driving the staple ends outward through the rim of the basket, if the baskets are large enough to receive the upper and lower heads C and B of the machine.

From the foregoing, it will be seen that by my invention I provide a machine which is capable of making and applying wire handles to bushel or half-bushel baskets, or other receptacles. The machine is capable of rapid operation, and can be driven at the speed necessary to apply the handles as rapidly as the baskets or other receptacles can be manually manipulated and presented in position to receive the handles. In this way, the high-grade handles are applied to the baskets, and the cost of manufacture is materially reduced.

What I claim as my invention is:—

1. A machine for making and applying handles to the sides of receptacles, comprising mechanism for bending wire to form a staple of a width to serve as a handle, means to bend the two ends of the staple in the same direction at right angles to the plane of the staple, means to support the receptacle in position to receive the handle, and a driver to advance the wire toward the receptacle and thereby insert said ends in the receptacle.

2. The said machine, as specified in claim 1, said mechanism operating horizontally in said plane, and said means operating vertically, so that said ends are bent downward toward the receptacle.

3. The said machine, as specified in claim 1, said means including a former which also serves to guide the bent staple-ends during the insertion thereof by said driver.

4. The said machine, as specified in claim 1, in combination with devices to feed the wire to said mechanism, and a cutter for severing the wire.

5. The said machine, as specified in claim 1, said mechanism including a horizontally operating former, and said machine having devices to feed the wire in front of said former, and a cutter disposed a distance from said former to sever the wire by movement different from and relative to said former.

6. A machine for making and applying handles to the sides of receptacles, comprising mechanism for bending wire to form a staple of a width to serve as a handle, means to bend the two ends of the staple in the same direction at right angles to the plane of the staple, and a driver to insert said ends in the receptacle, said means including a pair of pivoted members which are disposed in the path of said driver to support the staple, and which are movable out of said path to permit insertion of said ends by the driver.

7. A machine for making and applying handles to the sides of receptacles, comprising mechanism for bending wire to form a staple of a width to serve as a handle, means to bend the two ends of the staple in the same direction at right angles to the plane of the staple, and a driver to insert said ends in the receptacle, said means including a former to bend the staple-ends downward and movable members to support said staple during the bending operation, and said driver having cams to force said members out of the path of the driver.

8. The said machine, as specified in claim 1, said mechanism including a horizontally operating former and a vertical block to support the wire during the operation of said former and means on said former to depress said block and thereby permit forward movement of the staple bodily to said means.

9. The said machine, as specified in claim 1, in combination with a hopper to feed grips to said mechanism, means to feed wire through said grips, and devices to sever the wire, leaving the ends of the severed length of wire extending a distance from each end of the grip, and said mechanism having means to support the grip while the wire is being bent into staple-form.

10. A machine for making and applying handles to the sides of receptacles, comprising mechanism for bending wire to form a staple of a width to serve as a handle, means to bend the two ends of the staple in the same direction at right angles to the plane of the staple, a driver to insert said ends in the receptacle, a toggle for operating said mechanism, and means to actuate said toggle.

11. A machine for making and applying handles to the sides of receptacles, comprising mechanism for bending wire to form a staple of a width to serve as a handle, means to bend the two ends of the staple in the same direction at right angles to the plane of the staple, a driver to insert said ends in the receptacle, a cutter to sever the wire, and a toggle to operate said cutter, said mechanism including a former connected to operate said toggle.

12. The said machine, as specified in claim 1, said mechanism having provisions to feed the staples to said means, and said machine having a stop to engage the ends of the staple.

13. A machine for making and applying handles to the sides of receptacles, comprising mechanism for bending wire to form a staple of a width to serve as a handle, means to bend the two ends of the staple in the same direction at right angles to the plane of the staple, and a driver to insert said ends in the receptacle, said mechanism including a vertically movable block having spaced portions against which the wire is bent, said portions being in the form of plates secured to the opposite ends of said block, and said mechanism having a bevel for pushing said block down to feed the staple forward to said means.

Signed by me at Chicago, Illinois, this 29th day of March, 1916.

EDWARD CRAIG.